United States Patent
Oriani

(10) Patent No.: US 9,650,508 B2
(45) Date of Patent: *May 16, 2017

(54) HEAT AGING RESISTANT ETHYLENE VINYL ACETATE COPOLYMER COMPOSITION AND PROCESS FOR ITS PRODUCTION

(71) Applicant: E. I. DU PONT DE NEMOURS AND COMPANY, Wilmington, DE (US)

(72) Inventor: Steven R Oriani, Landenberg, PA (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/715,874

(22) Filed: May 19, 2015

(65) Prior Publication Data

US 2015/0247030 A1 Sep. 3, 2015
US 2017/0066916 A9 Mar. 9, 2017

Related U.S. Application Data

(62) Division of application No. 14/085,019, filed on Nov. 20, 2013, now Pat. No. 9,062,193.

(60) Provisional application No. 61/733,081, filed on Dec. 4, 2012.

(51) Int. Cl.
*C08L 31/04* (2006.01)
*C08L 33/08* (2006.01)
*C08L 77/00* (2006.01)
*C08L 23/08* (2006.01)

(52) U.S. Cl.
CPC ........... *C08L 31/04* (2013.01); *C08L 23/0853* (2013.01); *C08L 2205/02* (2013.01); *C08L 2312/00* (2013.01); *Y10T 428/139* (2015.01)

(58) Field of Classification Search
CPC .. C08L 23/0853; C08L 31/04; C08L 2205/02; C08L 2312/00
USPC .......................................... 525/57, 179, 183
See application file for complete search history.

(56) References Cited

U.S. PATENT DOCUMENTS

| | | | |
|---|---|---|---|
| 2,933,480 A | 4/1960 | Gresham et al. | |
| 4,966,940 A | 10/1990 | Tsuji et al. | |
| 5,948,503 A * | 9/1999 | Yamamoto | C08L 7/00 264/109 |
| 7,915,336 B2 | 3/2011 | Varnhorn et al. | |
| 9,062,193 B2 * | 6/2015 | Oriani | C08L 23/0853 |
| 2009/0247690 A1 * | 10/2009 | Varnhorn | C08L 31/04 524/507 |

FOREIGN PATENT DOCUMENTS

| | | |
|---|---|---|
| EP | 922732 B1 | 2/2004 |
| JP | 2007204674 A | 2/2006 |
| KR | 20090053585 A | 5/2009 |

OTHER PUBLICATIONS

Welker et al., "A New EPDM Grade with Improved Processing Characteristics for Automotive Hose Applications", present at the ACS Rubber Division technical meeting Oct. 2011.
Ma et al., "Effects of compatibilizing agent and in situ fibril on the morphology, interface and mechanical properties of EPDM/nylon copolymer blends", Polymer 43 (2002) pp. 937-945.
Liu et al., "Polyamide Reinforced EPDM Compatibilized with Maleic Anhydride Grafted Ethylene-Propylene-Diene Rubber", Polymers & Polymer Composites, vol. 11, No. 3, 2003.
La Rosa et al., "Electron Beam Curing of EVM and HNBR for Cable Compounds", Proceedings of the 55th International Wire and Cable Symposium 2005.
International Search Report for International Application No. PCT/US2013/072954, Mar. 27, 2014.

* cited by examiner

*Primary Examiner* — Ana Woodward

(57) ABSTRACT

Heat resistant ethylene vinyl acetate copolymer compositions comprising a blend of ethylene vinyl acetate copolymer, peroxide curable polyacrylate elastomer, and polyamide are described. When crosslinked with a peroxide curative, the ethylene vinyl acetate copolymer compositions exhibit enhanced resistance to heat aging compared to conventional ethylene vinyl acetate elastomer compositions.

21 Claims, No Drawings

HEAT AGING RESISTANT ETHYLENE VINYL ACETATE COPOLYMER COMPOSITION AND PROCESS FOR ITS PRODUCTION

CROSS-REFERENCE TO RELATED APPLICATION

This application claims priority under 35 U.S.C. §120 as a division of U.S. patent application Ser. No. 14/085,019, filed on Nov. 20, 2013, now issued as U.S. Pat. No. 9,062,193, which in turn claims priority under 35 U.S.C. §119 to U.S. Provisional Appln. No. 61/733,081, filed on Dec. 4, 2012, each of which is incorporated herein by reference in its entirety.

FIELD OF THE INVENTION

The present invention is directed to a peroxide curable ethylene vinyl acetate copolymer composition, a process for producing a thermoset ethylene vinyl acetate elastomer composition having enhanced heat aging performance, and to articles formed from the thermoset elastomer composition.

BACKGROUND OF THE INVENTION

Oil resistant ethylene vinyl acetate copolymers are well-known synthetic materials formed by copolymerizing ethylene and at least 40 wt % vinyl acetate. The ethylene vinyl acetate copolymers may contain only copolymerized ethylene units and vinyl acetate units or the copolymers may comprise additional copolymerized monomers, for example esters of unsaturated carboxylic acids, such as methyl acrylate or butyl acrylate. The raw polymers, also known as gums or gum rubbers, may be cured by free radical generators such as peroxides, azides, or by use of high energy radiation. Examples of commercially available ethylene vinyl acetate copolymers include Elvax® resin products from E. I. du Pont de Nemours and Company and Levapren® products from Lanxess Corp.

In view of their low cost compared to other oil resistant elastomers, ethylene vinyl acetate copolymers are widely used in the manufacture of wire and cable jacketing as well as in the production of automotive parts such as hoses and seals.

Resistance to heat aging is a particularly desirable property in rubber parts that are used in under the hood automotive applications, e.g. hoses, gaskets, and seals. Because such parts may be exposed to temperatures in excess of 160° C. for periods of time, including up to several hours on a regular basis, degradation of physical properties through oxidative embrittlement can occur. In ethylene vinyl acetate rubbers, this often results in a reduction in extensibility and an increase in hardness and modulus of the rubber article. Such effects are disclosed for example in published disclosure EP1081188. Methods to enhance hot air or heat aging resistance of ethylene vinyl acetate rubbers have involved attempts to identify more effective antioxidant systems. However, there is still a need to improve the high temperature resistance of these copolymers.

It has now been found that it is possible to produce cured ethylene vinyl acetate copolymer compositions of high hardness, strength, and elasticity that exhibit excellent heat aging resistance by dispersing particles of polyamide in a blend of ethylene vinyl acetate copolymer and a peroxide curable polyacrylate elastomer. The peroxide curable polyacrylate elastomer comprises copolymerized units of alkyl acrylate, and an amine or acid reactive monomer selected from the group consisting of unsaturated carboxylic acids, anhydrides of unsaturated carboxylic acids, and unsaturated epoxides. The amine or acid reactive monomer allows the polyacrylate elastomer to compatibilize the polyamide and the ethylene vinyl acetate copolymer, thereby improving physical properties such as strength and elongation to break. Polyacrylate elastomers comprising only polymerized units of acrylate monomers generally exhibit a poor cure response to peroxide. This is because contiguous polymerized units of acrylate monomers may lead to significant chain scission in the presence of free radicals, so the net increase in crosslink density is low. As defined herein, a peroxide curable acrylate elastomer must either comprise at least 0.5 mol % of an unsaturated pendant group which functions as a peroxide cure site monomer, or at least 50 mol % copolymerized units of ethylene. Copolymerized ethylene monomer units act as spacers between polymerized acrylate monomer units to limit β-scission.

A number of ethylene vinyl acetate copolymer-polyamide blend compositions have been disclosed in the prior art. For example, it is known to add uncured ethylene vinyl acetate copolymers (i.e. gums) to polyamides to form toughened thermoplastic compositions. U.S. Pat. No. 4,174,358 exemplifies the use of uncured ethylene vinyl acetate copolymers at levels up to 20 wt % as toughening additives for polyamides. A compatibilizer such as a maleic anhydride grafted ethylene vinyl acetate copolymer may also be included in the ethylene vinyl acetate copolymer-polyamide blend, as disclosed in *J. Polymer Science: Part B: Polymer Physics*, Vol. 47, 877-887 (2009). The polyamide component in these compositions comprises the continuous polymer matrix and the uncured ethylene vinyl acetate copolymer is a minor additive. When polyamide comprises the continuous phase in the blend the composition generally cannot be processed at temperatures below the melting temperature of the polyamide, or can be processed only with great difficulty at such temperatures.

It is also known to form thermoplastic elastomer compositions comprising ethylene vinyl acetate copolymer and polyamide. For example, U.S. Pat. No. 5,948,503 discloses compositions comprising an uncured elastic polymer, a polyamide in the form of fine fibers, and a polyolefin having a melting temperature from 80° C. to 250° C. In addition, certain vulcanized compositions are disclosed therein.

Thermoplastic vulcanizates comprising ethylene vinyl acetate copolymer and polyamide, in which the ethylene vinyl acetate copolymer is dynamically crosslinked (i.e., crosslinked under shear mixing to create a dispersion of elastomer particles in a continuous phase of another polymer) are also known. Such compositions are disclosed in EP2098566, and may be improved by the use of a coupling agent such as maleic anhydride grafted ethylene vinyl acetate copolymer as disclosed in U.S. Pat. No. 7,691,943.

U.S. Pat. No. 7,608,216 and U.S. Patent Application Publication 2006/0100368 disclose compositions prepared by admixing an uncured elastomer, for example an ethylene vinyl acetate copolymer, with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

A number of acrylate rubber-polyamide blend compositions have been disclosed in the prior art. For example, it is known to add uncured acrylate elastomers (i.e. gums) to polyamides to form toughened thermoplastic compositions. U.S. Pat. No. 4,174,358 discloses the use of various uncured acrylate elastomers or ethylene based thermoplastic resins comprising up to 95 mole percent ethylene, such as ethylene/methyl acrylate/monoethyl maleate/ethylene dimethacrylate tetrapolymers or ionomers of ethylene/methyl acrylate/monoethyl maleate terpolymers, as toughening additives for polyamides. The polyamide component in such compositions comprises the continuous polymer matrix and the uncured acrylate elastomer is a minor additive.

U.S. Pat. No. 5,070,145 discloses thermoplastic blends of polyamides with ethylene copolymers comprising copolymerized units of dicarboxylic acid anhydrides and optionally alkyl (meth)acrylates. U.S. Pat. No. 7,544,757 discloses that blends of ethylene-alkyl acrylate polymers may be blended at levels up to 30% by weight in polyamide to produce toughened polyamide compositions.

Blends of uncured ethylene acrylic elastomers, polyamides and powdered metals are disclosed in Japanese Patent 2001-1191387.

U.S. Pat. No. 3,965,055 discloses vulcanizates prepared from a blend of rubber and 2 wt % to 10 wt % of a crystalline fiber-forming thermoplastic, wherein the thermoplastic is dispersed in the rubber component in particles not greater than 0.5 micron in cross section with a length to diameter ratio greater than 2. The high aspect ratio of the thermoplastic particles enables pressureless curing without void formation.

Japanese Patent Application Publication H10-251452 discloses a dispersion of polyamide particles in a hydrogenated nitrile rubber (HNBR) matrix wherein a compatibilizing polymer that may be an ethylene copolymer or an acrylate elastomer is also present. The compatibilizing polymer is ionically crosslinked by metal oxide during mixing with the HNBR and polyamide which prevents the acrylate elastomer from forming a continuous phase. The HNBR component is then cured with a peroxide or with sulfur.

U.S. Pat. No. 6,133,375 discloses blends of functionalized rubbers with thermoplastics in which the thermoplastic component is dispersed in the rubber phase. Following addition of a curative for the rubber, the composition is crosslinked to produce a vulcanized article. Examples of functionalized rubbers which are disclosed include acrylic rubbers such as nitrile-butadiene rubber, hydrogenated nitrile-butadiene rubber, epichlorohydrin rubber, and rubbers on which reactive groups have been grafted, such as carboxylated nitrile-butadiene rubber. Thermoplastics that are disclosed include polyetherester block copolymers, polyurethanes, polyamides, polyamide ether or ester block copolymers, and mixtures of polyamides and polyolefins. In the latter case, ethylene-alkyl acrylate copolymers comprising grafted or co-polymerized maleic anhydride, glycidyl methacrylate, or (meth)acrylic acid units may be used to compatibilize the polyamide-polyolefin blend.

U.S. Pat. No. 4,694,042 discloses an elastomeric thermoplastic molding material containing a coherent phase of polyamide and crosslinked elastomeric polyacrylate core shell polymers.

U.S. Pat. No. 4,275,180 discloses blends of thermoplastic polymers with acrylate rubbers, the blends being crosslinked or crosslinkable by radiation or peroxide. Fillers may be used in amounts of up to 40% by weight of the composition.

U.S. Patent Application 2006/0004147 discloses blends of elastomers, for example acrylate elastomers, with thermoplastic polymers such as polyamides, in which both polymers are coupled and crosslinked by free radicals, e.g., by electron beam radiation. The compositions may comprise a continuous phase of thermoplastic with dispersed crosslinked elastomer particles, or a continuous crosslinked elastomer phase with dispersed crosslinked particles of what was initially thermoplastic.

U.S. Pat. No. 8,142,316 discloses cured blends of elastomers and thermoplastics for use in power transmission belts. The elastomer may be an ethylene acrylic elastomer, and the thermoplastic may be a polyamide. Free radical curatives are disclosed as curing agents.

It is also known to form dynamically cured thermoplastic compositions having a polyamide matrix continuous phase and a cured acrylate rubber phase that is present in the form of discrete particles. Thermoplastic elastomeric compositions comprising blends of polyamide and ionically crosslinked ethylene acrylic rubber are disclosed in U.S. Pat. No. 4,310,638. U.S. Pat. Nos. 5,591,798 and 5,777,033 disclose thermoplastic elastomer compositions comprising a blend of polyamide resins and covalently-crosslinked acrylate rubber.

Polyacrylate rubber-polyamide blend compositions disclosed in Zeon Chemicals L.P., HyTemp® Technical Manual, Rev. 2009-1, p. 46 (2009) are said to improve impact strength of plastics. They may also be used to produce thermoplastic elastomers.

It has now been found that when a dispersion of polyamide particles is present in a blend comprising ethylene vinyl acetate copolymer and peroxide curable polyacrylate elastomer, the resultant compositions, when cured by a free radical generator, exhibit enhanced resistance to physical property loss during heat aging. In addition, such compositions maintain excellent tensile strength, modulus, hardness, and elastic properties such as compression set and elongation at break that characterize conventional ethylene vinyl acetate compositions lacking polyacrylate elastomer and polyamide.

SUMMARY OF THE INVENTION

Disclosed herein is a blend composition of ethylene vinyl acetate copolymer, peroxide curable polyacrylate elastomer, and polyamide, said blend composition consisting essentially of (A) 10 wt % to 98 wt % of an ethylene vinyl acetate copolymer component said ethylene copolymer component comprising one or more ethylene vinyl acetate copolymers of at least 40% by weight copolymerized vinyl acetate monomer units; and (B) 1 wt % to 50 wt % of a one or more of peroxide curable polyacrylate elastomer component comprising copolymerized units of alkyl acrylate, and at least 0.03 mol % of an amine or acid reactive monomer selected from the group consisting of unsaturated carboxylic acids, anhydrides of unsaturated carboxylic acids, and unsaturated epoxides; and (C) 1 wt % to 60 wt % of a polyamide component comprising one or more polyamides having a melting peak temperature of at least 160° C., wherein said blend composition has a Mooney viscosity (ML 1+4, 100° C.) determined according to ASTM D1646 of 5 to 200; and wherein each of the weight percentages of the ethylene vinyl acetate copolymer, polyacrylate elastomer, and polyamide components are based on the combined weight of the ethylene vinyl acetate copolymers, polyacrylate elastomers, and polyamides in the blend composition.

Also disclosed herein is a curable blend composition comprising (A) a blend composition of ethylene vinyl acetate copolymer, peroxide curable polyacrylate elastomer, and polyamide comprising: (i) 10 wt % to 98 wt % of an ethylene vinyl acetate copolymer component comprising one or more ethylene vinyl acetate copolymers wherein the ethylene vinyl acetate copolymer comprises at least 40% by weight copolymerized vinyl acetate units; and (ii) 1 wt % to 50 wt % of one or more of a peroxide curable polyacrylate elastomer comprising copolymerized units of alkyl acrylate, and at least 0.03 mol % of an amine or acid reactive monomer selected from the group consisting of unsaturated carboxylic acids, anhydrides of unsaturated carboxylic acids, and unsaturated epoxides; and (iii) 1 wt % to 60 wt % of a polyamide component comprising one or more polyamides having a melting peak temperature of at least 160° C., wherein the blend composition (A) has a Mooney viscosity (ML 1+4, 100° C.) determined according to ASTM D1646 of 5 to 200; and wherein the weight percentages of each of the ethylene vinyl acetate copolymer, polyacrylate elastomer, and polyamide components are based on the combined weight of the components of the blend; and B a curative.

Also disclosed herein is a process for production of a curable blend composition comprising ethylene vinyl acetate copolymer, peroxide curable polyacrylate elastomer, polyamide, and peroxide curative comprising the steps (A) providing: (i) one or more ethylene vinyl acetate copolymers comprising at least 40% by weight vinyl acetate monomer; (ii) one or more peroxide curable polyacrylate elastomers comprising copolymerized units of alkyl acrylate, and at least 0.03 mol % of an amine or acid reactive monomer selected from the group consisting of unsaturated carboxylic acids, anhydrides of unsaturated carboxylic acids, and unsaturated epoxides; and (iii) one or more polyamides having a melting peak temperature of at least 160° C.; (B) mixing A (i), A (ii), and A (iii) at a temperature above the melting peak temperatures of the one or more polyamides to disperse the one or more polyamides within the blend of one or more ethylene vinyl acetate copolymers and polyacrylate elastomers, such that one or more ethylene vinyl acetate copolymer comprise 10 wt % to 98 wt %, the one or more peroxide curable polyacrylate elastomers comprise 1 wt % to 50 wt %, and the one or more polyamides comprise 1 wt % to 60 wt % of the blend based on the total weight of ethylene vinyl acetate copolymers, polyacrylate elastomers, and polyamides present and; (C) cooling the blend composition to a temperature below the crystallization peak temperatures of the one or more polyamides, thereby forming a blend composition having a Mooney viscosity (ML 1+4, 100° C.) of 5 to 200, as determined according to ASTM D1646; and (D) adding a peroxide curative to the blend of part C at a temperature less than 160° C.

A further disclosure herein is a process for preparing a curable blend composition comprising polyacrylate elastomer, polyamide, ethylene vinyl acetate copolymer, and peroxide curative, said process comprising the steps: (A) providing (i) one or more peroxide curable polyacrylate elastomers comprising copolymerized units of alkyl acrylate, and at least 0.03 mol % of an amine or acid reactive monomer selected from the group consisting of unsaturated carboxylic acids, anhydrides of unsaturated carboxylic acids, and unsaturated epoxides; and (ii) one or more polyamides having a melting peak temperature of at least 160° C.; and (B) mixing the one or more peroxide curable polyacrylate elastomers and one or more polyamides at temperature above the melting peak temperatures of the one or more polyamides to disperse the one or more polyamides within the one or more polyacrylate elastomers; (C) cooling the mixture of part B to a temperature below the peak crystallization temperatures of the one or more polyamides to produce an intermediate blend composition having a Mooney viscosity (ML 1+4, 100° C.) less than 200 as determined according to ASTM D1646; (D) providing one or more ethylene vinyl acetate copolymers comprising at least 40% by weight vinyl acetate monomer; and (E) mixing the intermediate blend composition of step (C) with the one or more ethylene vinyl acetate copolymers of step (D) to provide the blend composition, wherein said blend composition comprises 10 wt % to 98 wt % ethylene vinyl acetate copolymer, 1 wt % to 50 wt % peroxide curable polyacrylate elastomer, and 1 wt % to 60 wt % polyamide, each being based on the combined weight of the ethylene vinyl acetate copolymers, polyacrylate elastomers, and polyamides in the blend composition, and wherein said blend composition having a Mooney viscosity (ML 1+4, 100° C.) of 5-200, as determined according to ASTM D1646; and (E) and adding a peroxide curative to the blend of part D at a temperature less than 160° C.

DETAILED DESCRIPTION OF THE INVENTION

The present invention is directed to compositions comprising a blend of ethylene vinyl acetate copolymer, peroxide curable polyacrylate elastomer, and polyamide that, when cured with a free radical source such as a peroxide curative system, exhibit enhanced resistance to physical property loss during heat aging. The invention is also directed to compositions consisting essentially of blends of ethylene vinyl acetate copolymer, peroxide curable polyacrylate elastomer, and polyamide, and to curable compositions comprising ethylene vinyl acetate copolymer, peroxide curable polyacrylate elastomer, polyamide, and peroxide curative. The invention is also directed to curable blend compositions additionally comprising peroxide curative, and to a process to a process for preparation of cured articles from the heat resistant ethylene vinyl acetate copolymer compositions.

Disclosed herein are compositions wherein polyamide particles are dispersed in blends of ethylene vinyl acetate copolymers, (also known as EVM rubbers) and peroxide curable polyacrylate elastomers. The resultant compositions, when cured, exhibit surprising improvements in physical properties. That is, the curing process, which is also commonly referred to as crosslinking or vulcanization, converts the blend of ethylene vinyl acetate copolymer, polyacrylate elastomer, and polyamide to an elastomer composition that exhibits enhanced heat aging resistance compared to ethylene vinyl acetate elastomer compositions lacking both the polyacrylate elastomer and polyamide.

Another disclosure herein is a blend composition of ethylene vinyl acetate copolymer, peroxide curable polyacrylate elastomer, and polyamide, said blend composition consisting essentially of: (A) 10 wt % to 98 wt % of an ethylene vinyl acetate copolymer component, said ethylene copolymer component comprising one or more ethylene vinyl acetate copolymers of at least 40% by weight copolymerized vinyl acetate monomer units; and (B) 1 wt % to 50 wt % of a one or more of a peroxide curable polyacrylate elastomer component comprising copolymerized units of alkyl acrylate and at least 0.03 mol % of an amine or acid reactive monomer selected from the group consisting of unsaturated carboxylic acids, anhydrides of unsaturated carboxylic acids, and unsaturated epoxides; and (C) 1 wt % to 60 wt % of a polyamide component comprising one or more polyamides having a melting peak temperature of at least 160° C., wherein said blend composition has a Mooney viscosity (ML 1+4, 100° C.) determined according to ASTM D1646 of 5 to 200; and wherein each of the weight percentages of the ethylene vinyl acetate copolymer, polyacrylate elastomer, and polyamide components are based on the combined weight of the ethylene vinyl acetate copolymers, polyacrylate elastomers, and polyamides in the blend composition.

One embodiment of the invention is a curable ethylene vinyl acetate copolymer blend composition that comprises and a curative, preferably a peroxide curative. The blend composition is characterized by having a Mooney viscosity of 5 to 200 as determined in accordance with ASTM D1646, ML 1+4, 100° C.

The blend composition comprises, or in some embodiments consists essentially of, three polymer components: an ethylene vinyl acetate copolymer component, a polyacrylate elastomer component, and a polyamide component, and when combined with peroxide curative to form a curable composition is referred to herein as a heat resistant ethylene vinyl acetate copolymer composition. The ethylene vinyl acetate copolymer component of the blend comprises one or more ethylene vinyl acetate copolymers, each comprising at least 40 wt % vinyl acetate copolymerized units.

As used herein, the term "consisting essentially" means with respect to the blend composition that no more than 30 parts of a polyolefin having a melting peak temperature greater than 80° C. is present per hundred parts by weight based on the weight of the sum of the ethylene vinyl acetate copolymer component and the polyacrylate elastomer component. When more than 30 parts by weight of such high melting point polyolefin is present in the blend composition, the blend composition can be difficult to process into a curable composition, and if successfully processed, it may have poor elasticity.

The ethylene vinyl acetate copolymers useful in the practice of the invention described herein comprise copolymerized units of ethylene and vinyl acetate comonomers. Other comonomers may optionally be present, including alkyl esters or alkoxyalkyl esters of propenoic acid, carbon monoxide, alpha-olefins such as propene, 1-butene, 1-hexene, and the like, or comonomers that provide epoxide or acid functionality in the ethylene vinyl acetate polymer, for example. glycidyl methacrylate, maleic anhydride and its half esters, or (meth)acrylic acid.

The concentration of vinyl acetate comonomer present in these ethylene vinyl acetate copolymers will be at least 40 weight percent, based on the weight of the ethylene and vinyl acetate comonomer units in the copolymer. Preferably, the concentration will be at least 45 weight percent, and more preferably at least 50 weight percent. If the concentration of vinyl acetate is less than 40 wt %, the ethylene vinyl acetate copolymer will lack elastic properties.

Examples of ethylene vinyl acetate copolymers include Elvax® 40L03 resin, available from E. I. du Pont de Nemours and Company, Wilmington, Del., USA and Levapren® grades 400 through 900, available from Lanxess Corp., Germany.

The ethylene vinyl acetate copolymers that are used to prepare the heat resistant ethylene vinyl acetate copolymer compositions of the invention are curable gums, i.e. they are substantially uncured rubbers. By substantially uncured is meant that the unblended ethylene vinyl acetate copolymer has a sufficiently low viscosity to be blended with polyacrylate elastomer and polyamide. Preferably, the Mooney viscosity (ASTM D1646, ML 1+4 at 100° C.) of the ethylene vinyl acetate copolymer is less than 120, more preferably less than 80 and most preferably less than 40.

The polyacrylate elastomers useful in the practice of the invention described herein are amorphous. That is, the heat of fusion of the polyacrylate elastomer will generally be less than 4 J/g as measured by ASTM D3418-08, preferably less than 2 J/g, and most preferably about 0 J/g. The polyacrylate elastomers comprise polymerized units of alkyl esters and/or alkoxyalkyl esters of propenoic acid. Examples of such esters include alkyl acrylates, and alkoxyalkyl acrylates as well as species wherein the propenoic acid is substituted with a C1-C10 alkyl group. Examples of such species include alkyl methacrylates, alkyl ethacrylates, alkyl propacrylates, and alkyl hexacrylates, alkoxyalkyl methacrylates, alkoxyalkyl ethacryates, alkoxyalkyl propacrylates and alkoxyalkyl hexacrylates. In addition, the alkyl ester groups of the propenoic acid esters may be substituted with cyano groups or one or more fluorine atoms. That is, the ester group will be a C1-C12 cyanoalkyl group or a C1-C12 fluoroalkyl group. The acrylate polymers may also comprise copolymerized units of more than one species of the alkyl esters and/or alkoxyalkyl esters, for example two alkyl acrylates.

The alkyl and alkoxyalkyl esters of propenoic acid and substituted propenoic acids are preferably C1-C12 alkyl esters of acrylic or methacrylic acid or C1-C20 alkoxyalkyl esters of acrylic or methacrylic acid. Examples of such esters include methyl acrylate, methyl methacrylate, ethyl acrylate, ethyl methacrylate, butyl acrylate, butyl methacrylate, 2-ethylhexyl acrylate, 2-methoxyethylacrylate, 2-ethoxyethylacrylate, 2-(n-propoxy)ethylacrylate, 2-(n-butoxy)ethylacrylate, 3-methoxypropylacrylate and 3-ethoxypropylacrylate. Examples of esters that contain C1-C12 cyanoalkyl and fluoroalkyl groups include cyanomethylacrylate, 1-cyanoethylacrylate, 2-cyanopropylacrylate, 3-cyanopropylacrylate, 4-cyanobutylacrylate, 1,1-dihydroperfluoroethyl methacrylate, 1,1-dihydroperfluoroethyl acrylate, 1,1-dihydroperfluoropropyl methacrylate, 1,1-dihydroperfluoropropyl acrylate, and 1,1,5-trihydroperfluorohexyl (meth)acrylate, and 1,1,5-trihydroperfluorohexyl methacrylate. Preferably, the ester group will comprise C1-C8 alkyl groups. More preferably, the ester group will comprise C1-C4 alkyl groups. Particularly useful alkyl acrylate esters are methyl acrylate, ethyl acrylate and butyl acrylate. A particularly useful alkyl methacrylate ester is methyl methacrylate. Minor amounts of unsaturated acetates such as ethenyl acetate or 3-butenyl acetate may be incorporated into the polyacrylate elastomer without deviating from the scope of this invention. By minor amounts is meant less than 1 wt %, based on the weight of the polyacrylate elastomer.

Esters that comprise comonomer units in the polyacrylate elastomers may be generally represented by the formula

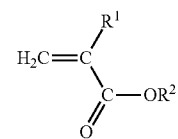

where R1 is H or C1-C10 alkyl and R2 is C1-C12 alkyl, C1-C20 alkoxyalkyl, C1-C12 cyanoalkyl, or C1-C12 fluoroalkyl.

In certain embodiments, the polyacrylate elastomers may be polymers derived from copolymerization of more than one acrylate comonomer. Examples of such acrylate polymers include copolymers of methyl acrylate and butyl acrylate; copolymers of methyl acrylate, butyl acrylate and the monoethyl ester of 1,4-butenedioic acid.

The concentration of propenoic acid ester comonomers that are present in the polyacrylate elastomer will be at least 50 weight percent, based on the weight of the polymer. Preferably, the concentration will be at least 55 weight percent, and more preferably at least 60 weight percent. If the concentration of propenoic acid ester is below 50 wt %, the likelihood that some crystallinity will be present is high, for example in acrylate polymers that are ethylene acrylate ester copolymers. In addition, a high content of non-polar monomer such as ethylene diminishes compatibility of the polyacrylate polymer with polyamide, and therefore physical properties of the blend will be decreased.

The polyacrylate elastomers useful in the practice of this invention are peroxide curable, meaning that they comprise either a diene cure site monomer at a level of at least 0.5 mol %, or at least 50 mol % ethylene. For example, the polyacrylate may comprise diene cure site monomers to form pendant unsaturation that can form crosslinks in the presence of free radicals, such 1,4-butadiene, 1,6-hexadiene, ethylidene norbornene, and the like. If copolymerized diene cure site monomers are not present at a level of at least 0.5 mol %, the acrylate polymers must comprise at least 50 mol % ethylene to confer peroxide curability on the polyacrylate elastomer.

The polyacrylate elastomers useful in the practice of the invention further comprise copolymerized monomer units selected from the group consisting of unsaturated carboxylic acids, anhydrides of unsaturated carboxylic acids, unsaturated epoxides, and mixtures of two or more thereof. These monomer units contain chemical groups (e.g., carboxyl and epoxy groups) that react with end groups common in polyamides, e.g. amines and carboxylic acids, and improve the physical properties of the blend.

Unsaturated carboxylic acids include for example, acrylic acid and methacrylic acid, 1,4-butenedioic acids, citraconic acid, and monoalkyl esters of 1,4-butenedioic acids. The 1,4-butenedioic acids may exist in cis- or trans- form or both, i.e. maleic acid or fumaric acid, prior to polymerization. Useful copolymerizable cure site monomers also include anhydrides of unsaturated carboxylic acids, for example, maleic anhydride, citraconic anhydride, and itaconic anhydride. Preferred cure site monomers include maleic acid and any of its half acid esters (monoesters) or diesters, particularly the methyl or ethyl half acid esters (e.g., monoethyl maleate); fumaric acid and any of its half acid esters or diesters, particularly the methyl, ethyl or butyl half acid esters; and monoalkyl and monoarylalkyl esters of itaconic acid. The presence of these copolymerized monomers produces polyacrylate elastomer compositions that exhibit good blend compatibility with polyamides.

Examples of useful unsaturated epoxides include for example, glycidyl (meth)acrylate, allyl glycidyl ether, glycidyl vinyl ether, and alicyclic epoxy-containing (meth) acrylates.

Preferably, the acrylate copolymer gum rubber comprises at least 0.03 mol % of cure site monomer units bearing the amine or acid reactive group, based on the total number of moles of monomer in the copolymer, more preferably at least 0.1 mol %, and most preferably more than 0.2 mol %.

In some embodiments, the polyacrylate elastomers useful in the practice of the invention will also comprise copolymerized units of additional comonomers, for example ethylene and other olefins such as propylene, 1-butene, 1-hexene, 1-octene, and the like. The olefin will be present at a concentration of less than 50 wt %, more preferably less than 45 wt %, and most preferably about 40 wt % or less, based on the weight of the polyacrylate polymer.

The heat resistant ethylene vinyl acetate copolymer compositions described herein comprise from about 1 wt % to about 60 wt % of one or more polyamides based on the combined weights of ethylene vinyl acetate copolymer, polyacrylate elastomer, and polyamide components, wherein the polyamide component has a melting peak temperature of at least about 160° C., more preferably at least 180° C., and most preferably at least 200° C., and preferably less than 270° C. as determined in accordance with ASTM D3418-08. Preferably the polyamide is solid at the curing temperature of the heat resistant ethylene vinyl acetate copolymer composition, meaning that the curing temperature is less than the melting peak temperature of the polyamide. While not wishing to be bound by theory, when the polyamide is not solid at the curing temperature, curative readily diffuses into the polyamide, rendering the blend difficult to cure. Polyamide resins are well known in the art and embrace those semi-crystalline resins having a weight average molecular weight of at least 5,000 and include those compositions commonly referred to as nylons. Thus, the polyamide component useful in the practice of the invention includes polyamides and polyamide resins such as nylon 6, nylon 7, nylon 6/6, nylon 6/10, nylon 6/12, nylon 11, nylon 12, polyamides comprising aromatic monomers, and polyamide block elastomers such as copoly(amide-ether) or copoly(amide-ester). The resins may be in any physical form, such as pellets and particles of any shape or size, including nanoparticles.

The viscosity of the polyamide resins can vary widely while meeting the aims of the present invention. To ensure that the polyamide becomes dispersed within a continuous phase of ethylene vinyl acetate copolymer, it is desirable that the polyamide have an inherent viscosity greater than 0.9 dL/g, more preferably greater than 1.1 dL/g, and most preferably greater than 1.3 dL/g, as measured in accordance with ASTM D2857-95, using 96% by weight sulfuric acid as a solvent at a test temperature of 25° C.

In general, as the concentration of the polyamide in the heat resistant ethylene vinyl acetate elastomer composition increases, the use of a polyamide of higher inherent viscosity becomes more desirable.

The polyamide resin can be produced by condensation polymerization of equimolar amounts of a saturated dicarboxylic acid containing from 4 to 12 carbon atoms with a diamine, which diamine contains from 4 to 14 carbon atoms. The polyamide may also be prepared by a ring opening polymerization reaction such as nylon 6, or by condensation of aminocarboxylic acids such as nylon 7 or 11.

Examples of polyamides include polyhexamethylene adipamide (66 nylon), polyhexamethylene azelaamide (69 nylon), polyhexamethylene sebacamide (610 nylon) and polyhexamethylene dodecanamide (612 nylon), the polyamide produced by ring opening of lactams, i.e. polycaprolactam, polylauriclactam, poly-11-aminoundecanoic acid, and bis(p-aminocyclohexyl)methanedodecanoamide. It is also possible to use polyamides prepared by the polymerization of two of the above polymers or terpolymerization of the above polymers or their components, e.g. an adipic acid isophthalic acid hexamethylene diamine elastomer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to elastomers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Block copoly(amide) elastomers are also suitable for use as the polyamide component provided the melting peak temperature of the polyamide block is at least 160° C. If a low softening point material comprises the block copoly (amide) elastomer, e.g., a polyether oligomer or a polyalkylene ether, for example, poly(ethylene oxide), then the block polymer will be a copoly(amide-ether). If a low softening point material of the block copoly(amide) elastomer comprises an ester, for example, a polylactone such as polycaprolactone, then the block elastomer will be a copoly (amide-ester). Any such low softening point materials may be used to form a block copoly(amide) elastomer. Optionally, the lower softening point material of the block copoly (amide) elastomer may comprise a mixture, for example, a mixture of any of the above-mentioned lower softening point materials. Furthermore, said mixtures of lower softening point materials may be present in a random or block arrangement, or as mixtures thereof. Preferably, the block copoly(amide) elastomer is a block copoly(amide-ester), a block copoly(amide-ether), or mixtures thereof. More preferably, the block copoly(amide) elastomer is at least one block copoly(amide-ether) or mixtures thereof. Suitable commercially available thermoplastic copoly(amide-ethers) include PEBAX® polyether block amides from Elf-Atochem, which includes PEBAX® 4033 and 6333. Most preferably, the polyamide is other than a block copoly (amide-ether) or copoly(amide-ester). Other polyamides have generally higher melting peak temperatures and exhibit better hot air aging as compared to polyamide block copoly (amide-ether) or copoly(amide-ester).

Preferred polyamides are homopolymers or copolymers wherein the term copolymer refers to polyamides that have two or more amide and/or diamide molecular repeat units.

The polyamide component may comprise one or more polyamides selected from Group I polyamides having a melting peak temperature of at least about 160° C., but less than about 210° C., and comprising an aliphatic or semi-aromatic polyamide, for example poly(pentamethylene decanediamide), poly(pentamethylene dodecanediamide), poly(ε-caprolactam/hexamethylene hexanediamide), poly (ε-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting peak temperature of at least about 210° C., and comprising an aliphatic polyamide selected from the group consisting of poly(tetramethylene hexanediamide), poly(ε-caprolactam), poly(hexamethylene hexanediamide), poly(hexamethylene dodecanediamide), and poly(hexamethylene tetradecanediamide); Group (III) polyamides having a melting peak temperature of at least about 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising about 50 to about 95 mole percent semi-aromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting peak temperature of at least about 260° C., comprising greater than 95 mole percent semi-aromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms. The polyamide may also be a blend of two or more polyamides.

Preferred polyamides include nylon 6, 6/10, 10/10, 11, 6/12, 12, 6/6, and Group IV polyamides having a melting peak temperature less than about 270° C. These polyamides have a melting peak temperature sufficiently high so as not to limit the scope of applications for the heat resistant ethylene vinyl acetate copolymer compositions, but not so high that production of the blends causes significant degradation of the ethylene vinyl acetate copolymer or polyacrylate elastomer. Also preferred are polyamides formed by ring opening or condensation of aminocarboxylic acids.

Polyamides suitable for use in the invention are widely commercially available, for example Zytel® resins, available from E. I. du Pont de Nemours and Company, Wilmington, Del., USA, Durethan® resins, available from Lanxess Corp., Germany, and Ultramid® resins available from BASF Corp., USA.

Preferably, the polyamide component of the heat resistant ethylene vinyl acetate copolymer compositions is present in the blend composition in the form of approximately spherical particles, i.e., the aspect ratio of the particles is less than 10 to 1. When the aspect ratio exceeds about 10 to 1, the viscosity of the blend composition is increased and molding or extruding the blend composition at a temperature less than the melting peak temperature of the polyamide component becomes difficult. Generally, the size of the polyamide particles is relatively unimportant, though tensile strength of the cured composition becomes optimal when most of the particles are about 2 micrometers in diameter or smaller. Such blend compositions can be mixed, molded and/or extruded using conventional techniques to produce curable compositions that may be crosslinked with conventional curative systems to form a wide variety of elastomer articles.

The blend compositions of the invention comprise, or in some cases consist essentially of, from about 10 to about 98 weight percent of the ethylene vinyl acetate copolymer component described herein, from about 1 to about 50 weight percent of the polyacrylate elastomer component described herein, and from about 1 to about 60 weight percent of the polyamide component described herein, based on the total weight of the ethylene vinyl acetate copolymer, polyacrylate elastomer, and polyamide components. The ethylene vinyl acetate copolymer component may be made up of one or more than one ethylene vinyl acetate copolymers of the type described herein as being suitable for use in the practice of the invention. Similarly, the polyacrylate elastomer or polyamide component may be made up of one or more than one polyacrylate elastomers or polyamides of the type described herein as being suitable for use in the practice of the invention. Preferably, the curable compositions will comprise from about 30 to about 90 weight percent ethylene vinyl acetate copolymer component, from about 5 to about 30 weight percent polyacrylate elastomer, and from about 5 to about 40 weight percent polyamide component, based on the total weight of the ethylene vinyl acetate copolymer and polyamide components. More preferably, the curable compositions will comprise from about 50 to about 90 weight percent ethylene vinyl acetate copolymer component, from about 5 to about 20 weight percent of the polyacrylate elastomer component, and form about 5 to about 30 weight percent polyamide component based on the total weight of the ethylene vinyl acetate copolymer and polyamide components. These percentages provide a heat resistant ethylene vinyl acetate copolymer composition such that a cured article made therefrom can, undergo heat aging for one week at 190° C. or two weeks at 175° C. and maintain an elongation to break of at least 100%. In addition, the polymer blends exhibit Mooney viscosities (ML 1+4, 100° C.), as determined according to ASTM D1646, of 5-200, preferably 10-150, and most preferably 10-100.

Various blending options can be used, including: (i) mixing polyacrylate elastomers and ethylene vinyl acetate copolymers with molten polyamides, or (ii) mixing polyacrylate elastomers with molten polyamides that are subsequently cooled to solidify the polyamide and then mixed with ethylene vinyl acetate copolymers. These blending options may result in a wide range of blend morphologies, ranging from (i) those wherein discrete, discontinuous polyamide particles exist within a continuous matrix of polyacrylate elastomer and ethylene vinyl acetate copolymer, to (ii)) compositions wherein high aspect ratio polyamide "fibers" are present, to (iii) compositions that comprise co-continuous structures, to (iv) compositions comprising discrete domains of polyacrylate elastomer and ethylene vinyl acetate copolymer within a continuous phase of polyamide. Most of these compositions have morphologies that are unsuitable for use in the present invention, because the blends have very high Mooney viscosities, i.e. Mooney viscosity ML 1+4, 100° C. of greater than about 200, or exhibit such poor processability at temperatures less than the melting peak temperature of the polyamide that the Mooney viscosity cannot be measured. A Mooney viscosity greater than 200, or the inability to measure Mooney viscosity, indicates that the polyamide comprises a continuous or a high aspect ratio fibrous phase in the blend. Such blends exhibit poor processability for extrusion or molding, and poor elastic properties after curing if a cured article can successfully be formed. A Mooney viscosity less than 200, preferably less than 150, and most preferably less than 100, is confirmatory of a blend morphology wherein the polyamide comprises a discontinuous phase that does not have a high aspect ratio.

With respect to the polyamide of the present invention, by "discontinuous" is meant that the polyamide is present in the blend compositions of the invention as dispersed particles or domains surrounded by ethylene vinyl acetate copolymer and polyacrylate elastomer. By "high aspect ratio" is meant that the ratio of the largest to smallest dimensions of a typical polyamide domain in the blend is greater than about 10. In general, the polyamide domains in the heat resistant ethylene vinyl acetate copolymer compositions of the invention will preferably be completely isolated from each other within the continuous ethylene vinyl acetate copolymer and polyacrylate elastomer matrix, and be approximately spherical. However, in certain instances a small percentage, less than about 5%, of localized sites in the blend composition may exist wherein the polyamide domains are aggregated or connected to each other, or have an aspect ratio greater than about 10. After cooling, the polyamide domains no longer flow and the morphology of the polyamide component remains unchanged during further mixing processes at temperatures less than the melting peak temperature of the polyamide.

A preferred method of producing the blend compositions involves a sequential blending process. A peroxide curable polyacrylate elastomer component comprising copolymerized units of alkyl acrylate and at least 0.03 mol % of an amine or acid reactive monomer selected from the group consisting of unsaturated carboxylic acids, anhydrides of unsaturated carboxylic acids, and unsaturated epoxides and a polyamide component are first mixed at a temperature above the melting peak temperature of the polyamide, to disperse the polyamide in a continuous phase of polyacrylate elastomer. The polyacrylate elastomer-polyamide blend is then cooled and blended with ethylene vinyl acetate copolymer at a temperature less than the melting peak temperature of the polyamide to form a blend composition comprising 10-98 wt % ethylene vinyl acetate, 1-50 wt % polyacrylate, and 1-60 wt % polyamide. Because the polyamide morphology is determined by the initial melt mixing step with polyacrylate elastomer, to ensure the polyamide does not comprise the continuous phase of the polyacrylate elastomer-polyamide blend, the Mooney viscosity (ML 1+4, 100° C.) of this blend must be measurable and less than 200, preferably less than 150, most preferably less than 100. Sequential blending as described eliminates the need to expose the relatively thermally unstable ethylene vinyl acetate copolymer to the high temperatures needed for melt mixing with polyamide. In addition, the compatibilization reaction between polyamide and acid or amine reactive sites on the polyacrylate elastomer is favored when ethylene vinyl acetate copolymer is substantially absent during the melt mixing process.

Alternatively, one is able to prepare a blend composition, as disclosed herein by the following process. The process starts with providing one or more ethylene vinyl acetate copolymers comprising at least 40% by weight vinyl acetate monomer; one or more peroxide curable polyacrylate elastomers comprising copolymerized units of alkyl acrylate, and at least 0.03 mol % of an amine or acid reactive monomer selected from the group consisting of unsaturated carboxylic acids, anhydrides of unsaturated carboxylic acids, and unsaturated epoxides; and one or more polyamides having a melting peak temperature of at least 160° C. The process then requires mixing the components at a temperature above the melting peak temperature(s) of the one or more polyamides to disperse the one or more polyamides within the one or more ethylene vinyl acetate copolymers and polyacrylate elastomers, such that one or more ethylene vinyl acetate copolymer comprise from about 10 wt % to about 98 wt %, the one or more peroxide curable polyacrylate elastomers comprise from about 1 wt % to about 50 wt %, and the one or more polyamides comprise from about 1 wt % to about 60 wt % of the blend based on the total weight of ethylene vinyl acetate copolymers, polyacrylate elastomers, and polyamides present. After mixing these, the mixture is cooled to a temperature below the crystallization peak temperatures of the one or more polyamides, thereby forming a blend composition having a Mooney viscosity (ML 1+4, 100° C.) of 5 to 200, as determined according to ASTM D1646.

A heat resistant ethylene vinyl acetate copolymer composition may be formed by a process that includes mixing a peroxide curative into a blend composition comprising 10-98 wt % ethylene vinyl acetate, 1-50 wt % polyacrylate, and 1-60 wt % polyamide having a Mooney viscosity (ML 1+4, 100° C.) of 5 to 200, as determined according to ASTM D1646, at a temperature below the melting peak temperature of the one or more polyamides.

The heat resistant ethylene vinyl acetate copolymer compositions may only be formed by mixing the polyamide component into the polyacrylate elastomer component and optionally the ethylene vinyl acetate component at temperatures above the melting peak temperature of the polyamide, under conditions that do not produce a dynamic cure of the polyacrylate elastomer or the ethylene vinyl acetate copolymer, followed by cooling the thus-produced polymer blend. That is, the curative, generally a peroxide curative, will not be present when the polyamide component, polyacrylate elastomer component, and optionally the ethylene vinyl acetate copolymer component are being mixed. This is because the mixing temperature specified (above the melting peak temperature of the one or more polyamides) is above that at which crosslinking and/or gelling of the polyacrylate elastomer or ethylene vinyl acetate copolymer will occur in the presence of peroxide. Gelling or crosslinking of the polyacrylate elastomer or ethylene vinyl acetate copolymer during mixing with molten polyamide forces the polyamide to become the continuous phase in the blend, so that after the blend composition has cooled and the polyamide has solidified, the blend composition becomes difficult or impossible to further process at a temperature less than the melting peak temperature of the polyamide component. In particular, a blend composition with a continuous polyamide phase may exhibit a Mooney viscosity (ML 1+4, 100° C.) greater than 200, or it may exhibit flow behavior such that the Mooney viscosity cannot be measured. Inability to measure a Mooney viscosity of the blend composition occurs either because the blend cannot be formed into the Mooney test specimen by conventional rubber processing techniques at a temperature less than the melting peak temperature of the polyamide, or because the test specimen crumbles during the Mooney test.

Cooling of the blend composition formed by mixing the polyacrylate elastomer component, polyamide component, and optionally the ethylene vinyl acetate component serves to crystallize the polyamide domains so that the polyamide becomes solid and therefore cannot coalesce to form a continuous phase upon subsequent mixing, e.g., when mixed with an peroxide curative to form a curable composition. The resulting mixture can be an intermediate blend composition in the case where one or more ethylene vinyl acetate copolymers are added, for example if ethylene vinyl acetate copolymer was not present during the mixing of the polyacrylate elastomer and polyamide, or if additional ethylene vinyl acetate copolymers are added to a blend of polyacrylate elastomer, ethylene vinyl acetate copolymer, and polyamide. Preferably, the ethylene vinyl acetate copolymer is mixed with the intermediate blend at a temperature less than the melting peak temperature of the polyamide. The temperature below which the blend must be cooled can be determined by measuring the crystallization peak temperature according to ASTM D3418-08. The blends of ethylene vinyl acetate copolymer, polyacrylate elastomer, and polyamide may exhibit multiple crystallization peak temperatures. In such cases, the lowest crystallization peak temperature is taken as the temperature below which the blend must be cooled to fully solidify the polyamide component. Generally, the blend is cooled to 40° C. or less, which is sufficient to solidify the polyamides useful in the practice of the present invention.

The curable compositions that are heat resistant ethylene vinyl acetate copolymer compositions described herein also comprise a peroxide curative. By "curable" is meant that the increase in torque measured in accordance with ASTM D5289-07a using an MDR 2000 from Alpha Technologies operating at 0.5° arc and at test conditions of 177° C. for 24 minutes is at least 2.5 dN-m. More preferably the torque increase is at least 4 dN-m, and most preferably at least 5.5 dN-m. The increase in torque is the difference MH-ML, where ML refers to the minimum torque value measured and MH refers to the maximum torque value attained after the measurement of ML. Suitable peroxide curatives, also known as peroxide curing systems, comprise a peroxide and optionally a coagent. Examples of peroxides and coagents include curative systems as generally known in the art, including those described herein, operative at the temperature employed during vulcanization. For example, useful organic peroxides are those that decompose rapidly within the temperature range of 150° C. to 250° C. These include, for example, dicumyl peroxide, 2,5-bis(t-butylperoxy)-2,5-dimethylhexane, and α',α'-bis(t-butylperoxy)-diisopropylbenzene (available from Arkema Inc. under the tradename Vul-Cup® peroxide). In a typical curable composition the peroxide is present in amounts of from about 0.5 to 5 parts phr (parts per hundred parts rubber, i.e. parts per hundred parts of the sum of the ethylene vinyl acetate copolymers and polyacrylate elastomers present). The peroxide may be adsorbed on an inert carrier such as calcium carbonate, carbon black or kieselguhr; however, the weight of the carrier is not included in the above range. Generally, an optional coagent will be present to increase the state of cure of the finished part. The coagent can be for example, N,N'-(m-phenylene) dimaleimide, trimethylolpropane trimethylacrylate, tetraallyloxyethane, triallyl cyanurate, tetramethylene diacrylate, or polyethylene oxide glycol dimethacrylate. A preferred coagent is N,N'-(m-phenylene) dimaleimide, available from E. I. du Pont de Nemours and Company as HVA-2. The amount of the coagent used is generally about 0 to 5 parts by weight per 100 parts (phr) of the sum of the ethylene vinyl acetate copolymer and polyacrylate elastomer, preferably about 1 to 5 parts phr. The coagents usually contain multiple unsaturated groups such as allyl groups or acrylic ester groups.

The addition of curative to the blend composition will desirably take place at a temperature below the decomposition temperature of the peroxide and below the temperature at which the crosslinking reaction occurs. Generally, the addition will take place at a temperature below 160° C., preferably below 140° C., and most preferably at a temperature no greater than 120° C. The addition of the curative may take place simultaneously with the addition of optional processing ingredients, such as colorants, conventional carbon black or mineral reinforcing agents, antioxidants, processing aids, fillers and plasticizers, or it may be an operation separate from addition of the other ingredients. The addition may be conducted on a two-roll rubber mill or by using internal mixers suitable for compounding gum rubber compositions, including Banbury® internal mixers, Haake Rheocord® mixers, Brabender Plastograph® mixers, Farrel Continuous Mixers, or single and twin screw extruders.

After addition of the curatives and other optional ingredients such as fillers, plasticizers, pigments, antioxidants, process aids, etc., to the blend composition, the resulting heat resistant ethylene vinyl acetate copolymer composition desirably exhibits a strong (meaning favorable) cure response as determined in accordance with ASTM D5289-07a using an MDR 2000 from Alpha Technologies, Ohio, USA operating at 0.5° arc and at test conditions of 177° C. for 24 minutes.

In another embodiment, the invention is directed to a curable composition that is a heat resistant ethylene vinyl acetate copolymer composition comprising ethylene vinyl acetate copolymer, polyacrylate, polyamide, and a peroxide curative. Said curable composition exhibits an increase in torque of at least 2.5 dN-m, preferably at least 4.0 dN-m, and most preferably at least 5.5 dN-m, as determined in accordance with ASTM D5289-07a using an MDR 2000 from Alpha Technologies operating at 0.5° arc and at test conditions of 177° C. for 24 minutes.

To achieve optimal heat aging resistance, an antioxidant may be added to the curable ethylene vinyl acetate copolymer composition prior to curing. Useful antioxidants include, but are not limited to, aryl amines, phenolics, imidazoles, and phosphites. Thus, in some embodiments, the antioxidant will be a phosphorus ester antioxidant, a hindered phenolic antioxidant, an amine antioxidant, or a mixture of two or more of these compounds. The proportion of the antioxidant compound in the composition is typically 0.1 to 5 phr, preferably about 0.5 to 2.5 phr. The weight ratio of the phenolic or amine antioxidant to the phosphorus compound in the mixtures is about 0.5 to 3, and preferably the ratio is about 1.

Examples of aryl amines that may be useful antioxidants include 4,4'-bis(α,α-dimethylbenzyl)diphenylamine, diphenylamine and alkylated diphenylamines, 4-aminodiphenyl amine, and N-phenyl-N'-(p-toluenesulfonyl)-p-phenylenediamine. Examples of phenolic antioxidants include 4,4'-butylenebis(6-t-butyl-m-cresol), 1,3,5-trimethyl-2,4,6-tris-(3,5-di-t-butyl-4-hydroxybenzyl)benzene, and 4,4'-thiobis-(3-methyl-6-t-butylphenol). Examples of phosphite antioxidants include triphenylphosphite, bis(2,4-di-t-butylphenyl)pentaerythritol diphosphite, and tris(2,4-ditert-butylphenyl)phosphite. Examples of imidazole antioxidants include 2-mercaptomethylbenzimidazole, 2-mercaptobenzimidazole, and zinc 4- and -5-methyl-2-mercapto-benzimidazole. Combinations of antioxidants may be used, generally at levels between 0.1 and 5 phr based on 100 parts of the ethylene vinyl acetate copolymer in the compound.

Suitable hindered phenolic antioxidants can be, for example 4,4'-butylidenebis(6-t-butyl-m-cresol), 1,3,5-trimethyl-2,4,6-tris-(3,5-di-t butyl-4-hydroxybenzyl)benzene, 2,6-di-t-butyl-α-dimethylamino-p-cresol and 4,4'-thiobis-(3-methyl-6-t-butylphenol).

Antioxidants comprising the salt of a strong base and a weak acid, optionally combined with a carbodiimide, as disclosed in EP1081188, may also be used in the heat resistant ethylene vinyl acetate copolymer compositions.

Preferred antioxidant compositions contain tri(mixed mono- and dinonylphenyl) phosphate mixed with either 4,4'-butylidenebis(6-t-butyl-m cresol) or 4,4'-bis(α,α-dimethylbenzyl)diphenylamine. Preferred antioxidant compositions contain 4,4'-bis(α,α-dimethylbenzyl)diphenylamine (available commercially as Naugard® 445 from Chemtura Corp.) or 4-aminodiphenyl amine. Antioxidants may be added while the ethylene vinyl acetate copolymer is melt mixed with the polyamide, or after the blend has cooled.

In other embodiments, the heat resistant ethylene vinyl acetate copolymer compositions of the invention may be blended with another polymer, e.g. an elastomer, to dilute the polyamide content of the inventive composition by any mixing process, either above or below the melting peak temperature peak of the polyamide, providing the presence of the additional polymer does not increase the Mooney viscosity (ML 1+4, 100° C.) of the resulting composition to above 200. The polymer used for the blending process may be an ethylene vinyl acetate copolymer or polyacrylate elastomer, and may further comprise fillers, curatives, or other ingredients. Preferably, such dilution occurs at a temperature below that of the melting peak temperature of the polyamide, and if a curative is present, below the temperature needed to initiate curing.

In addition, the heat resistant ethylene vinyl acetate copolymer compositions may optionally comprise additional components including fillers, including but limited to carbon black, mineral fillers, scorch retarders, ignition resistant fillers and additives, plasticizers, process aids, waxes, pigments, and colorants. Such optional components will generally be present in amounts of from about 0.1 phr to about 200 phr, based on the weight of the sum of the ethylene vinyl acetate copolymer and polyacrylate elastomer. The addition of such optional components may take place during preparation of the polymer blend or at the time of mixing of curative into the composition.

Curing or crosslinking (also referred to as vulcanization) of the curable compositions of the invention typically involves exposing the heat resistant ethylene vinyl acetate copolymer composition to elevated temperature and elevated pressure for a time sufficient to crosslink the ethylene vinyl acetate copolymer and polyacrylate elastomer. Such operations generally are conducted by placing the curable heat resistant ethylene vinyl acetate composition into a mold that is heated in a press (often referred to as press-curing). Alternatively, the curable compositions may be extruded into various shapes. Such extruded shapes or parts are often cured in a pressurized autoclave. After the press cure or autoclave cycle is completed, this initial cure may be followed by an optional post-cure heating cycle at ambient pressure to further cure the heat resistant ethylene vinyl acetate copolymer composition. For example, the vulcanizate may be formed and cured using conventional press cure procedures at about 160° C. to about 220° C. for about 1 to 60 minutes. Post-cure heating may be conducted at about 160° C. to about 200° C. for one to several hours. Once crosslinked, the compositions described herein are not thermoplastic, but thermoset. Suitable cure conditions will depend on the particular curable compound formulation and are known to those of skill in the art.

The vulcanizates prepared from the heat resistant ethylene vinyl acetate copolymer compositions described herein exhibit unusually good resistance to embrittlement during heat aging, as evidenced by retention of tensile elongation at break following heat aging at 190° C. for one week or two weeks at 175° C. and a reduction in the increase in Shore A hardness as a result of heat aging. For example, replacement of one quarter of the ethylene vinyl acetate copolymer in a curable compound by a blend of polyacrylate elastomer and polyamide can provide over five times greater elongation at break after one week heat aging at 190° C., and over five times less change in Shore A hardness. This degree of improvement is unusual. Furthermore, these advantages in heat aging are gained with no sacrifice in compression set resistance.

Heat resistant ethylene vinyl acetate copolymer compositions prepared by the processes described herein can be used in a wide variety of industrial applications, for production of articles including wire and cable jacketing, spark plug boots, hoses, belts, miscellaneous molded boots, molded or extruded tubing or hose, molded boots, belts, grommets, seals and gaskets, vibration dampeners, weather stripping, seals and gaskets. Hose applications include turbocharger hoses, transmission oil cooler hoses, power steering hoses, air conditioning hoses, air ducts, fuel line covers, and vent hoses.

Examples of seals include engine head cover gaskets, oil pan gaskets, oil seals, lip seal packings, O-rings, transmission seal gaskets, seal gaskets for a crankshaft or a camshaft, valve stem seals, power steering seals, and belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials

Ethylene Vinyl Acetate Copolymer (EVA)

EVA1 Copolymer of ethylene and 50 wt % vinyl acetate, Mooney viscosity (ML 1+4 at 100° C.) of 25, available from Lanxess Corp. as Levapren® 500 resin.

EVA2 Copolymer of ethylene and 45 wt % vinyl acetate, Mooney Viscosity (ML1+4 at 100° C.) of 19, available from Lanxess Corp. as Levapren® 450 resin.

Polyacrylate Elastomer

AE1 Amorphous copolymer of methyl acrylate, ethylene and monoethyl maleate comprising 55 wt % (about 29 mole %) copolymerized methyl acrylate units, 43 wt % copolymerized ethylene units (about 70 mol %), and approximately 2 wt % (about 0.6 mol %) copolymerized units of monoethyl maleate; Mooney viscosity (ML 1+4) at 100° C. of 33.

Polyamide

P1 Polyamide 6, inherent viscosity 1.450 dL/g, melting peak temperature 220° C., available from BASF as Ultramid® B40.

P2 Polyamide 6/6, melting peak temperature 262° C., available from E.I. duPont de Nemours as Zytel® 42A.

Other Ingredients

Peroxide: mixture of the para and meta isomers of an α,α'-bis(tert-butylperoxy)-diisopropylbenzene, 40% peroxide active ingredient on kaolin clay carrier, Vul-Cup® 40KE, available from Arkema Inc.

Coagent: N,N'-(m-phenylene)dimaleimide, HVA-2, available from DuPont.

Carbon black: N550 grade, Sterling® SO carbon black, available from Cabot Corp.

Antioxidant (AO): Naugard® 445 antioxidant, available from Chemtura Corp.

Test Methods

Mooney viscosity: ASTM D1646, ML 1+4, 100° C.

Cure response: Measured per ASTM D5289-07a using an MDR 2000 from Alpha Technologies operating at 0.5° arc. Test conditions of 177° C. for 24 minutes. ML refers to the minimum torque value measured during the test, while MH refers to the maximum torque value attained after ML.

Compression set: ISO 815-1:2008, 25% compression, using type B molded buttons prepared using press cure conditions of 175° C. for 10 minutes. Time and temperature of the test conditions as specified. Data reported are the median values of 3 specimens.

Tensile properties: ASTM D412-06, die C. Samples cut from 1.5 to 2.5 mm thick molded plaques press cured at 175° C. for 10 minutes and optional post cure of 30 minutes at 175° C. as noted followed by aging for 24 hours at ambient conditions of 23° C. and 50% relative humidity. Data reported are the median value of 3 specimens. The rupture properties of tensile strength and elongation are indicated as Tb and Eb, (tensile at break and elongation at break, respectively). Test temperature is 23° C.+2° C. Shore A hardness: measured using 6 mm thick samples composed of 2 mm thick plies, cured as described for tensile properties, aged for 24 hours at ambient conditions of 23° C. and 50% relative humidity, per ASTM D2240-05 test method, using a type 2 operating stand. The median value of 5 readings is reported.

Heat aging: Tensile specimens, prepared as described above are hung in a hot air oven for the specified time and temperature. The specimens are conditioned at ambient conditions of 23° C. and 50% RH for at least 24 hours before tensile properties are measured.

Inherent viscosity of polyamides: Measured in accordance with ASTM D2857-95, using 96% by weight sulfuric acid as a solvent at a test temperature of 25° C. Samples were dried for 12 hours in a vacuum oven at 80° C. prior to testing.

Melting peak temperature: Measured in accordance with ASTM D3418-08.

Example 1

Blend B1, comprising polyacrylate elastomer and polyamide, was produced as follows. Polyamide P1 was metered by weight loss feeder into the first barrel section of a 43 mm Berstorff® co-rotating twin screw extruder with twelve barrel sections, operating at a screw speed of 250 rpm. At the same time, polyacrylate elastomer AE1 was metered into the fourth section of the extruder via a specially configured extruder and a melt pump for accurate feed rates. Melt temperature of the blend reached about 280° C. After exiting the twelfth barrel section, the resultant blend was pelletized and cooled to 25° C. before further processing. Composition and properties of blend B1 are shown in Table 1. Transmission electron micrographs of blend B1 indicate that the polyacrylate elastomer is the continuous phase in the blend, and the polyamide is dispersed in roughly spherical domains of approximately 0.5 to 2 um diameter.

TABLE 1

|  | B1 % |
| --- | --- |
| AE1 | 60 |
| P1 | 40 |
| Mooney Viscosity |  |
| ML1 + 4, 100 C. | 62 |

B1 was then further blended with EVA1 at approximately 40° C. on a roll mill to produce blends B2-B4, as shown in Table 2.

TABLE 2

|  | Blend | | |
| --- | --- | --- | --- |
|  | B2 phr | B3 phr | B4 phr |
| B1 | 107.1 | 62.5 | 27.8 |
| EVA1 | 35.7 | 62.5 | 83.3 |

TABLE 2-continued

|  | Blend | | |
| --- | --- | --- | --- |
|  | B2 phr | B3 phr | B4 phr |
| Mooney Viscosity |  |  |  |
| ML1 + 4, 100 C. | 45 | 34 | 27 |
| Composition in weight % |  |  |  |
| EVA1 | 25 | 50 | 75 |
| AE1 | 45 | 30 | 15 |
| P1 | 30 | 20 | 10 |

The formulations and properties of curable heat resistant ethylene vinyl acetate compositions E1-E6 and comparative curable ethylene vinyl acetate compositions CE1-CE5 are shown in Table 3. The curable compositions were prepared by charging the ingredients as shown to a Brabender® mixing bowl fitted with cam rotors, operating at 50 rpm. The bowl set temperature was 50° C., and the mixing time was three minutes. The batch temperatures did not exceed 100° C. After removing the compounds from the mixing bowl, they were sheeted on a cold roll mill, and preforms were stamped out for molding plaques, compression set buttons, and for measuring cure response.

Results in Table 3 show that all the curable compounds exhibit a good cure response. Compounds E1, E2, and E3 do not contain carbon black, yet exhibit much greater tensile strength and Shore A hardness after press cure than the comparative composition CE1, which also does not contain carbon black. After heat aging for one week at 190° C., all the inventive compositions have tensile elongation to break greater than 100% and very slight changes in Shore A hardness (less than 5 points) wherein comparative compositions exhibit less than 20% elongation to break and Shore A hardness increases of at least 18 points.

TABLE 3

| | E1 phr | E2 phr | E3 phr | E4 phr | E5 phr | E6 phr | CE1 phr | CE2 phr | CE3 phr | CE4 phr | CE5 phr |
| --- | --- | --- | --- | --- | --- | --- | --- | --- | --- | --- | --- |
| B2 | 142.9 | | | 142.9 | | | | | | | |
| B3 | | 125.0 | | | 125.0 | | | | | | |
| B4 | | | 111.1 | | | 111.1 | | | | | |
| EVA1 | | | | | | | 100 | 100 | 100 | 100 | 100 |
| Peroxide | 5 | 5 | 5 | 5 | 5 | 5 | 5 | 5 | 5 | 5 | 5 |
| Coagent | 2 | 2 | 2 | 2 | 2 | 2 | 2 | 2 | 2 | 2 | 2 |
| Antioxidant | 1 | 1 | 1 | 1 | 1 | 1 | 1 | 1 | 1 | 1 | 1 |
| Carbon black | | | | 9 | 18 | 27 | | 9 | 18 | 27 | 36 |
| Weight percent of EVA1, AE1, and P1 based on the total polymer content | | | | | | | | | | | |
| EVA1 (%) | 25 | 50 | 75 | 25 | 50 | 75 | 100 | 100 | 100 | 100 | 100 |
| AE1 (%) | 45 | 30 | 15 | 45 | 30 | 15 | 0 | 0 | 0 | 0 | 0 |
| P1 (%) | 30 | 20 | 10 | 30 | 20 | 10 | 0 | 0 | 0 | 0 | 0 |
| Cure Response | | | | | | | | | | | |
| ML (dN-m) | 0.4 | 0.3 | 0.3 | 0.5 | 0.3 | 0.3 | 0.2 | 0.2 | 0.2 | 0.3 | 0.5 |
| MH (dN-m) | 12.4 | 10.1 | 8.2 | 13.9 | 12.4 | 12 | 7.4 | 7.9 | 9 | 11.5 | 14.3 |
| MH-ML (dN-m) | 12.0 | 9.8 | 8.0 | 13.4 | 12.1 | 11.7 | 7.2 | 7.7 | 8.8 | 11.2 | 13.9 |
| Tensile properties and Shore A hardness after press cure | | | | | | | | | | | |
| Shore A | 57 | 50 | 44 | 61 | 61 | 61 | 40 | 46 | 50 | 58 | 62 |
| Tb (MPa) | 12.6 | 10 | 6.8 | 17.9 | 16.1 | 17.6 | 1.7 | 5.2 | 12.5 | 15.2 | 16 |
| Eb (%) | 225 | 240 | 270 | 235 | 230 | 245 | 200 | 240 | 260 | 245 | 205 |
| Tensile properties and Shore A hardness after press cure followed by one week hot air aging at 190° C. | | | | | | | | | | | |
| Shore A | 54 | 45 | 42 | 57 | 60 | 63 | 79 | 65 | 75 | 78 | 80 |
| Tb (MPa) | 10.7 | 7.8 | 4.8 | 11.6 | 11.7 | 8.8 | * | 5.2 | 5.3 | 7 | 4.5 |

TABLE 3-continued

|  | E1 phr | E2 phr | E3 phr | E4 phr | E5 phr | E6 phr | CE1 phr | CE2 phr | CE3 phr | CE4 phr | CE5 phr |
| --- | --- | --- | --- | --- | --- | --- | --- | --- | --- | --- | --- |
| Eb (%) change in | 230 | 240 | 235 | 190 | 180 | 135 | * * too brittle to test | 5 | 15 | 20 | 15 |
| Sh A (pts) | −3 | −5 | −2 | −4 | −1 | 2 | 39 | 19 | 25 | 20 | 18 |
| Tb (%) | −15 | −22 | −29 | −35 | −27 | −50 | −100 | 0 | −58 | −54 | −72 |
| Eb (%) | 2 | 0 | −13 | −19 | −22 | −45 | −100 | −98 | −94 | −92 | −93 |
| Compression set, 70 hrs at 150° C. | | | | | | | | | | | |
| (%) | 28 | 21 | 16 | 36 | 31 | 33 | 16 | 17 | 19 | 24 | 16 |

Example 2

Blend B5 comprises polyacrylate AE1 and polyamide P2 as shown in Table 4, and is produced according to the method of blend B1 in Example 1. Transmission electron micrographs of blend B5 indicate that the polyacrylate elastomer is the continuous phase in the blend, and the polyamide is dispersed in roughly spherical domains of approximately 2 to 5 um diameter.

TABLE 4

|  | B5 % |
| --- | --- |
| AE1 | 55 |
| P2 | 45 |
| Mooney Viscosity | |
| ML1 + 4, 100 C. | 69 |

B5 was further blended with EVA2 on a roll mill at approximately 40° C. to produce blends B6-B10 as shown in Table 5, ranging in polyamide content from 10 wt % to 0.2 wt %.

TABLE 5

| Blend | | | | | |
| --- | --- | --- | --- | --- | --- |
|  | B6 phr | B7 phr | B8 phr | B9 phr | B10 phr |
| EVA2 | 88.61 | 94.67 | 97.95 | 99.5 | 99.8 |
| B5 | 25.32 | 11.83 | 4.56 | 1.12 | 0.45 |
| Mooney Viscosity | | | | | |
| ML1 + 4, 100 C. | 20 | 18 | 17 | 16 | 16 |
| Composition in weight % | | | | | |
| EVA2 | 77.78 | 88.89 | 95.55 | 98.89 | 99.55 |
| AE1 | 12.22 | 6.11 | 2.45 | 0.61 | 0.25 |
| P2 | 10 | 5 | 2 | 0.5 | 0.2 |

Blends B6-B10 were further compounded to produce curable compounds E7-E9, CE6, and CE7 as shown in Table 6, using a Brabender® mixing bowl as described in Example 1.

A control compound (CE8) using EVA2 as the sole polymer component was also produced via the Brabender mixing bowl procedure as described in Example 1. Results in Table 6 show that all the compounds exhibit a strong cure response, and similar Shore A hardness and tensile properties after press cure. After hot air aging for two weeks at 175° C., however, the inventive compounds comprising at least 1% polyamide and 1% polyacrylate elastomer exhibit only a 3 point increase in Shore A hardness, compared with 10 points or more for the comparative examples. In addition, after heat aging the inventive compositions have more than three times greater tensile elongation to break than the comparative examples.

TABLE 6

| Compound | E7 phr | E8 phr | E9 phr | CE6 phr | CE7 phr | CE8 phr |
| --- | --- | --- | --- | --- | --- | --- |
| B6 | 113.93 | | | | | |
| B7 | | 106.5 | | | | |
| B8 | | | 102.51 | | | |
| B9 | | | | 100.62 | | |
| B10 | | | | | 100.25 | |
| EVA2 | | | | | | 100 |
| Coagent | 2 | 2 | 2 | 2 | 2 | 2 |
| Peroxide | 5 | 5 | 5 | 5 | 5 | 5 |
| Antioxidant | 1 | 1 | 1 | 1 | 1 | 1 |
| Carbon black | 30 | 30 | 30 | 30 | 30 | 30 |
| Cure Response | | | | | | |
| ML (dN-m) | 0.3 | 0.3 | 0.3 | 0.3 | 0.3 | 0.3 |
| MH (dN-m) | 10.5 | 9.5 | 9.3 | 9 | 9.1 | 9 |
| MH-ML (dN-m) | 10.2 | 9.2 | 9 | 8.7 | 8.8 | 8.7 |
| Tensile properties and Shore A hardness after press cure | | | | | | |
| Shore A | 60 | 61 | 61 | 59 | 60 | 59 |
| Tb (MPa) | 13.6 | 13.9 | 12.8 | 12.3 | 12.2 | 12.2 |
| Eb (%) | 210 | 240 | 235 | 205 | 230 | 210 |
| Tensile properties and Shore A hardness after press cure and two weeks hot air aging at 175° C. | | | | | | |
| Shore A | 63 | 58 | 64 | 69 | 76 | 79 |
| Tb (MPa) | 10.1 | 7.2 | 4.5 | 3.3 | 4.4 | 5.3 |
| Eb (%) change in | 170 | 125 | 75 | 20 | 20 | 20 |
| Sh A (pts) | 3 | −3 | 3 | 10 | 16 | 20 |
| Tb (%) | −26 | −48 | −65 | −73 | −64 | −57 |
| Eb (%) | −19 | −48 | −68 | −90 | −91 | −90 |

Example 3

Blends B11 and B12 were produced by charging EVA2, AE1, and P1 in the proportions shown in Table 7 to a Brabender® mixing bowl. The bowl was fitted with roller blades, and preheated to 240° C. The three polymers were mixed at a rotor speed of 100 rpm. As the temperature of the batch achieved 220° C. (the melting peak temperature of P1), a timer was started and air cooling initiated to maintain a batch temperature of about 240° C. After 3 minutes of mixing, the blends were discharged from the bowl, and cooled to room temperature before further processing.

TABLE 7

|  | Blend | |
| --- | --- | --- |
|  | B11 % | B12 % |
| EVA2 | 67 | 60 |
| AE1 | 3 | 10 |
| P1 | 30 | 30 |
| Mooney Viscosity | | |
| ML1 + 4, 100 C. | 36 | 36 |

Curable compositions E10 and E11 were produced according to the formulations in Table 8 by roll mill mixing at a temperature of about 40° C. These compositions exhibit strong cure response, and excellent physical properties after press cure followed by a post cure of 30 minutes at 175° C., as well as after hot air aging of one week at 190° C.

TABLE 8

|  | Compound | |
| --- | --- | --- |
|  | E10 phr | E11 phr |
| B11 | 142.9 |  |
| B12 |  | 142.9 |
| Coagent | 2 | 2 |
| Peroxide | 5 | 5 |
| Antioxidant | 1 | 1 |
| Cure Response | | |
| ML (dN-m) | 0.4 | 0.4 |
| MH (dN-m) | 11.8 | 11.4 |
| MH-ML (dN-m) | 11.4 | 11 |
| Tensile properties and Shore A hardness after press cure 10 min/ 175° C. and post cure 30 minutes/175° C. | | |
| Shore A | 60 | 60 |
| Tb (MPa) | 13.5 | 13.4 |
| Eb (%) | 200 | 215 |
| Tensile properties and Shore A hardness after press cure, post cure and 1 week hot air aging at 190° C. | | |
| Shore A | 56 | 57 |
| Tb (MPa) | 9.1 | 9.4 |
| Eb (%) | 180 | 185 |

What is claimed is:

1. A blend composition of ethylene vinyl acetate copolymer, peroxide curable polyacrylate elastomer, and polyamide, said blend composition consisting of
   (A) from about 10 wt % to about 98 wt % of an ethylene vinyl acetate copolymer component said ethylene vinyl acetate copolymer component comprising one or more ethylene vinyl acetate copolymers of at least 40% by weight copolymerized vinyl acetate monomer units;
   (B) from about 1 wt % to about 50 wt % of a one or more of peroxide curable polyacrylate elastomer component comprising copolymerized units of alkyl acrylate, and at least 0.03 mol % of copolymerized units of an amine or acid reactive monomer selected from the group consisting of unsaturated carboxylic acids, anhydrides of unsaturated carboxylic acids, and unsaturated epoxides;
   (C) from about 1 wt % to about 60 wt % of a polyamide component comprising one or more polyamides having a melting peak temperature of at least 160° C.; and, optionally
   (D) one or more additional components selected from the group consisting of fillers, plasticizers, waxes, pigments, and colorants;
   wherein said blend composition has a Mooney viscosity (ML 1+4, 100° C.) determined according to ASTM D1646 of 5 to 200; wherein said blend composition, upon curing, forms a thermoset material; and wherein each of the weight percentages of the ethylene vinyl acetate copolymer, polyacrylate elastomer, and polyamide components are based on the combined weight of the ethylene vinyl acetate copolymers, polyacrylate elastomers, and polyamides in the blend composition.

2. The composition of claim 1 wherein the polyamide is nylon 6 or nylon 6/6.

3. The composition of claim 1 wherein the polyamide has an inherent viscosity greater than 0.9 dL/g.

4. The composition of claim 1 wherein the polyamide is present in the form of particles having an aspect ratio of less than 10 to 1.

5. The composition of claim 1 wherein the polyacrylate elastomer comprises at least 50 mol % ethylene.

6. The composition of claim 1, said composition comprising from about 50 wt % to about 90 wt % of the ethylene vinyl acetate copolymer component, 5 wt % to 20 wt % of the polyacrylate elastomer component, and 5 wt % to 30 wt % of the polyamide component.

7. The composition of claim 1, wherein upon addition of a curative said composition exhibits an increase in torque MH-ML of at least 2.5 dN-m as measured per ASTM D5289-07a operating at 0.5° arc, and test conditions of 177° C. for 24 minutes.

8. A process for production of the composition of claim 1, said process comprising the steps
   (A) providing (i); (ii); and (iii);
   (B) mixing (i), (ii), and (iii) together at a temperature above the melting peak temperatures of the one or more polyamides to disperse the one or more polyamides within the blend of one or more ethylene vinyl acetate copolymers and polyacrylate elastomers, such that one or more ethylene vinyl acetate copolymer comprise 10 wt % to 98 wt %, the one or more peroxide curable polyacrylate elastomers comprise 1 wt % to 50 wt %, and the one or more polyamides comprise 1 wt % to 60 wt % of the blend based on the total weight of ethylene vinyl acetate copolymers, polyacrylate elastomers, and polyamides present, to produce a mixture; and
   (C) cooling the mixture to a temperature below the crystallization peak temperatures of the one or more polyamides, thereby forming a blend composition having a Mooney viscosity (ML 1+4, 100° C.) of 5 to 200, as determined according to ASTM D1646.

9. The process of claim 8, wherein said blend composition comprises 50 wt % to 90 wt % of the ethyl vinyl acetate copolymer component; 5 wt % to 20 wt % of the polyacrylate elastomer component; and 5 wt % to 30 wt % of the polyamide component.

10. The process of claim 8 wherein the polyamide is nylon 6 or nylon 6/6.

11. The process of claim 8 wherein the polyamide has a melting peak temperature greater than 200° C. and less than 270° C.

12. The process of claim 8, said process further comprising, adding one or more antioxidant in an amount of from 0.5 to 5 phr.

13. The process of claim 8, wherein upon addition of a curative the composition has a cure response MH-ML of at least 2.5 dN-m as determined according to ASTM D5289-07a, operating at 0.5° arc and test conditions of 177° C. for 24 minutes.

14. The process of claim 8, further comprising the step of molding or extruding the blend composition to form an article selected from the group consisting of wire jacketing, cable jacketing, molded or extruded tubing or hose, or molded boots, belts, grommets, seals and gaskets, said process further comprising the step of forming the article.

15. An article formed by the process of claim 14.

16. A process for preparing the composition of claim 1, said process comprising the steps:
(A) providing: (i) one or more curable polyacrylate elastomers comprising copolymerized units of alkyl acrylate, and at least 0.03 mol % of copolymerized units of an amine or acid reactive monomer selected from the group consisting of unsaturated carboxylic acids, anhydrides of unsaturated carboxylic acids, and unsaturated epoxides; and (ii) one or more polyamides having a melting peak temperature of at least 160° C.;
(B) mixing the one or more curable polyacrylate elastomers and one or more polyamides at temperature above the melting peak temperatures of the one or more polyamides to disperse the one or more polyamides within the one or more polyacrylate elastomers to provide a mixture;
(C) cooling the mixture of part B to a temperature below the peak crystallization temperatures of the one or more polyamides to produce an intermediate blend composition having a Mooney viscosity (ML 1+4, 100° C.) less than 200 as determined according to ASTM D1646;
(D) providing one or more ethylene vinyl acetate copolymers comprising at least 40% by weight vinyl acetate monomer; and
(E) mixing the intermediate blend composition of step (C) with the one or more ethylene vinyl acetate copolymers of step (D) to provide a blend composition comprising 10 wt % to 98 wt % ethylene vinyl acetate copolymer, 1 wt % to 50 wt % curable polyacrylate elastomer, and 1 wt % to 60 wt % polyamide, each weight percentage being based on the combined weight of the ethylene vinyl acetate copolymers, polyacrylate elastomers, and polyamides in the blend composition.

17. The process of claim 16, further comprising the step of molding or extruding the blend composition to form an article selected from the group consisting of wire jacketing, cable jacketing, molded or extruded tubing or hose, or molded boots, belts, grommets, seals and gaskets, said process further comprising the step of forming the article.

18. An article formed by the process of claim 17.

19. The blend composition of claim 1, wherein the polyamide has a melting peak temperature greater than 200° C. and less than 270° C.

20. The blend composition of claim 1, further comprising one or more antioxidants in an amount of from 0.5 to 5 phr.

21. An article comprising the blend composition of claim 1.

* * * * *